United States Patent Office 2,974,488
Patented Mar. 14, 1961

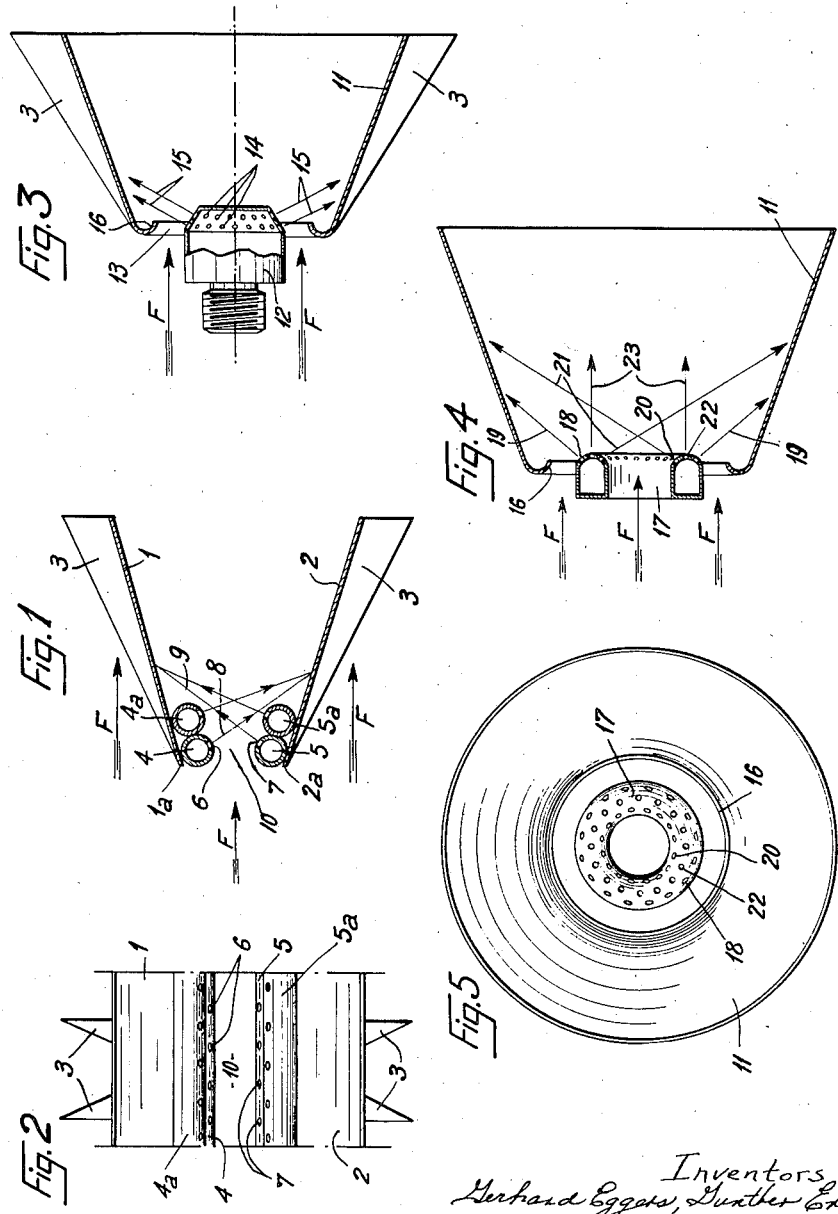

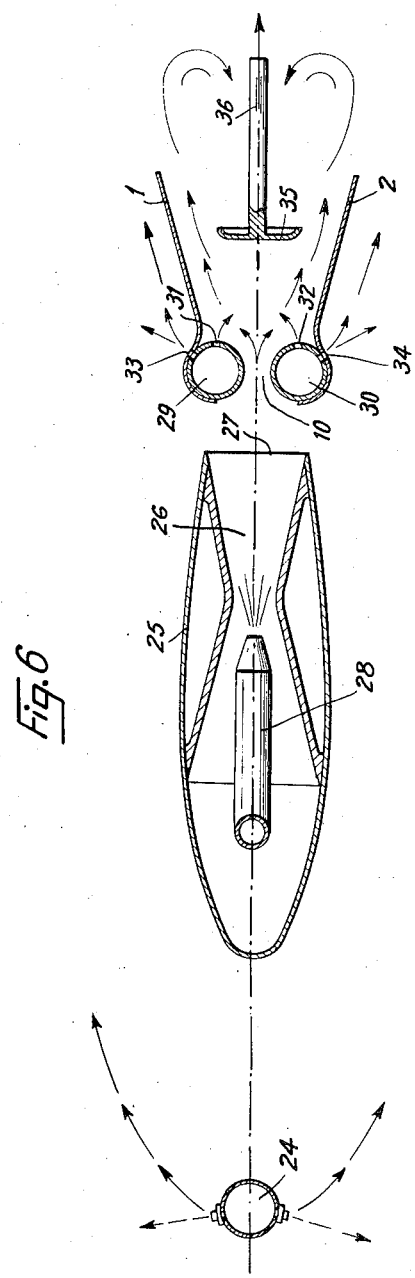

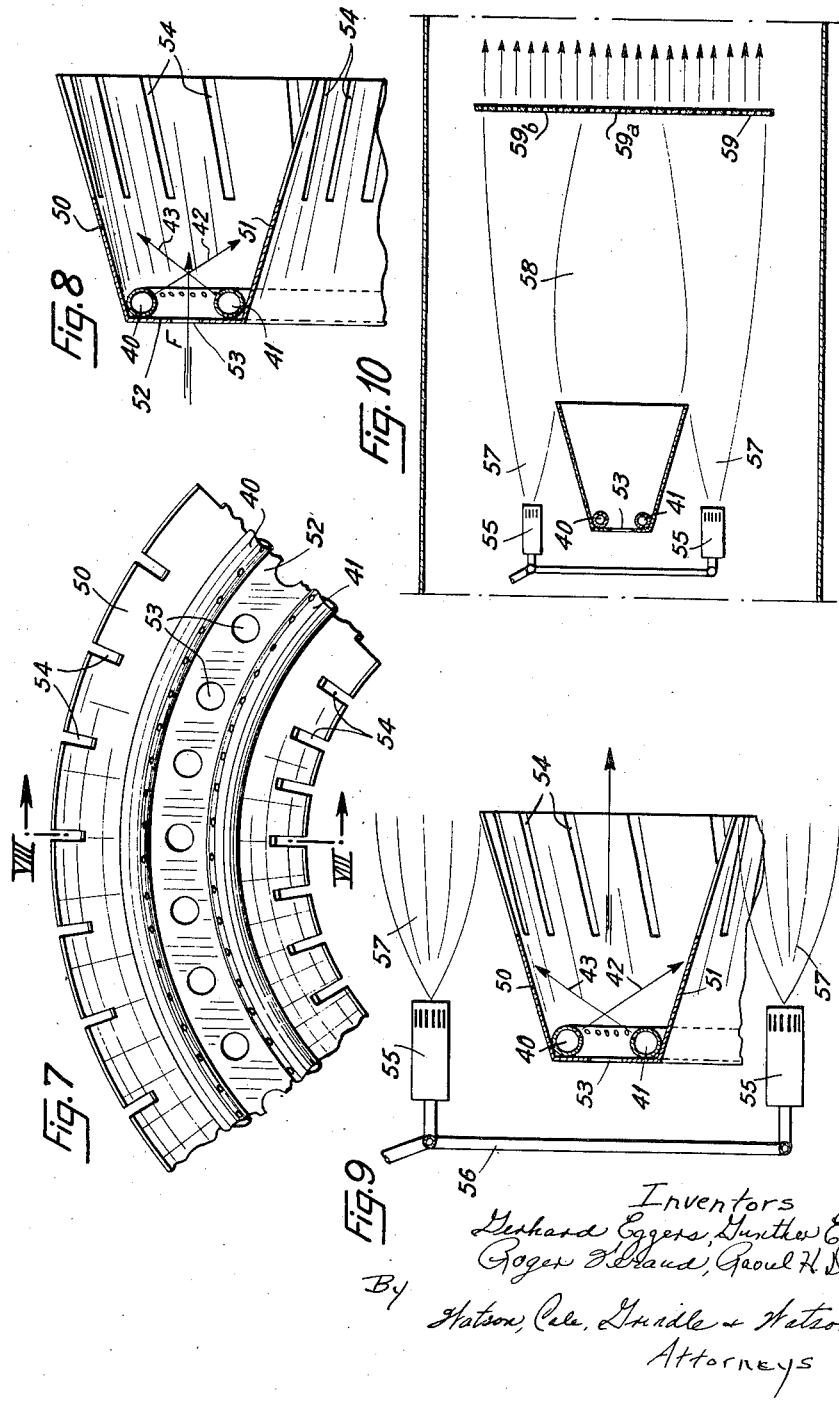

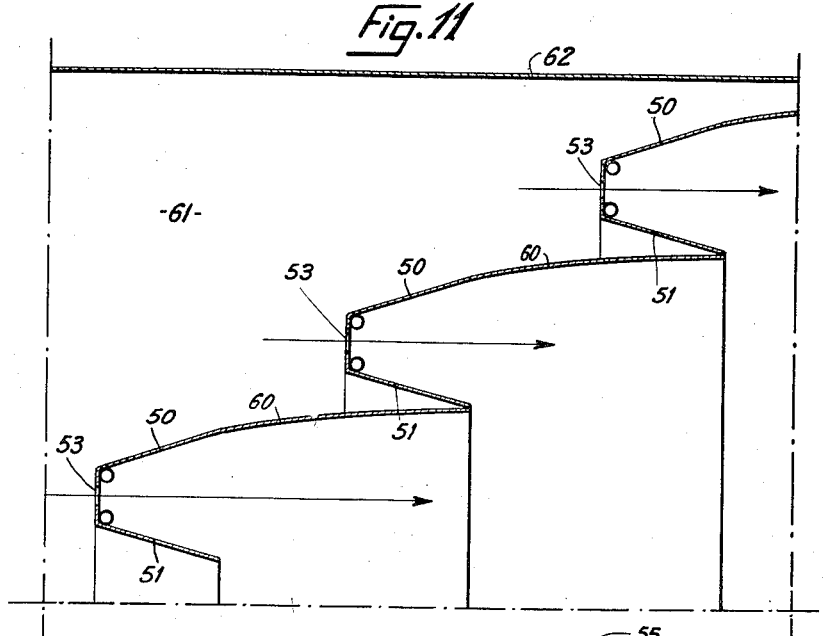
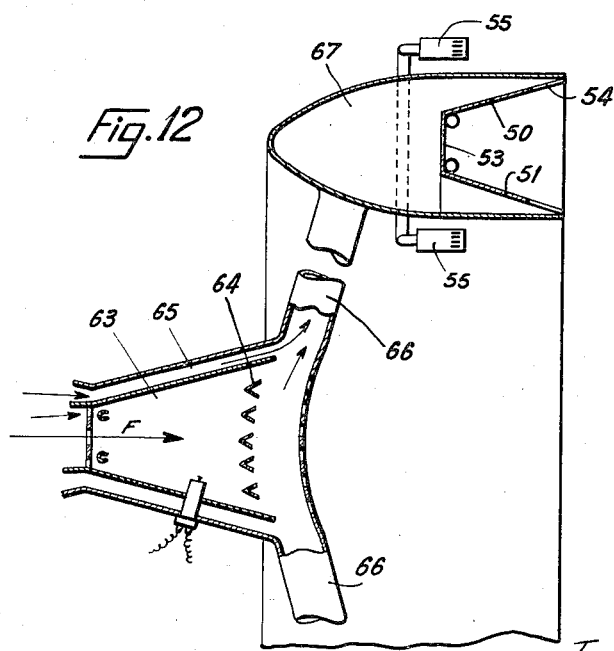

2,974,488

COMBUSTION DEVICES FOR CONTINUOUS-FLOW INTERNAL COMBUSTION MACHINES

Gerhard Eggers and Günther Ernst, Dammarie-les-Lys, Roger Feraud, Epinay-sur-Orge, and Raoul Henri Dumez, Montrouge, France, assignors to Societe Nationale d'Etude et de Construction de Moteurs d'Aviation, Paris, France, a company of France Filed Nov. 22, 1957, Ser. No. 698,078

Claims priority, application France Nov. 27, 1956

9 Claims. (Cl. 60—39.72)

The constant increase in the rate of mass-flow and that of the speed of flow in continuous-flow internal-combustion machines, for example turbo-jet units and ram-jet units, necessitate an ever-increasing efficiency of devices for injection of fuel, supply of combustion-supporting gas and stabilisation of the flame.

The present invention has for its object a device which combines the functions of fuel injector, fuel-burner and flame-stabiliser, intended to be employed in a combustion chamber through which passes a flow of combustion-supporting gas at high speed. This device comprises essentially a body having a section in the form of a V, the walls of which diverge in the direction of the flow, and which is provided at its upstream extremity with one or a number of openings for the passage of a certain fraction of the said flow, fuel-injectors being arranged close to this opening or openings and directed towards the said walls, so that the jets of fuel, inclined with respect to the direction of flow in the interior of the said body, impinge against the said walls.

This body of V-section is preferably constituted either by two plane surfaces inclined one with respect to the other, and enclosing a space in the shape of a truncated prism, the small base of which is directed towards the upstream side, or by two coaxial frusto-conical surfaces of opposite inclination, forming a divergent annular conduit. The fins or other protuberances projecting from the outer face of the V-section body may preferably be provided so as to increase the turbulence created by the surfaces of this body.

In accordance with one form of embodiment of the invention, the fuel is injected by means of racks located along the leading edges of the walls of this body, these racks being shaped in such manner as to create a certain turbulence in the interior of the said body and forming, at least in part, the inlet opening or openings of the combustion-supporting gas. In an alternative form in which the racks are spaced away from the walls, the latter are provided on their leading edges with an edge projecting towards the interior and forming an obstacle which produces a wake-zone.

In accordance with a further form of embodiment of the invention, the walls of the V-section body are movable and can be folded back one on the other so as to reduce their drag during the periods in which the combustion device is not in operation.

The present invention is further applicable to other forms of construction and also to various special features which will be brought out in the text which follows.

The description which follows below with reference to the accompanying drawings (which are given by way of example only and not in any sense by way of limitation) will make it quite clear how the invention may be carried into effect, the special features which are brought out, either in the text or in the drawings, being understood to form a part of the said invention.

Fig. 1 is a diagrammatic longitudinal cross-section of a device in accordance with the invention.

Fig. 2 is an end view of the same device.

Figs. 3 and 4 are longitudinal cross-sections of two alternative forms.

Fig. 5 is an end view of the alternative form of embodiment shown in Fig. 4.

Fig. 6 shows a combination comprising a device constructed in conformity with the present invention.

Fig. 7 shows an improved form of embodiment of the device according to the invention.

Fig. 8 is a cross-section taken along the line VIII—VIII of Fig. 7.

Figs. 9 and 10 show a device in which provision is made for auxiliary external injectors.

Fig. 11 is a very diagrammatic cross-section of a combustion chamber provided with a plurality of devices in accordance with the invention.

Fig. 12 shows a modification of this device.

The device shown by way of example in Figs. 1 and 2 comprises essentially two metal plates 1 and 2 inclined in opposite directions with respect to the direction of flow F of the air or combustion-supporting mixture, and creating by this means a turbulence in the centre of this flow. This turbulence may further be increased by external oblique fins 3 of straight, helicoidal or like form.

Along the leading edges 1a and 2a of these plates are arranged injection racks 4 and 5 which form between them a passage 10 of rectangular section through which the primary air can pass into the interior of the space enclosed by the walls 1 and 2. The racks 4 and 5 have injection orifices 6 and 7 orientated in a direction inclined with respect to F, so as to form fuel jets 8 and 9 directed towards the opposite walls 2 and 1 respectively.

In Fig. 1 there has been shown a second pair of racks 4a and 5a next to the racks 4 and 5 and also producing jets directed towards the opposite wall.

These racks will, in addition, produce a certain turbulence in the space inside the body 1—2.

The device which has just been described carries out the three functions necessary for the effective combustion in the centre of a flow of gas at high speed:

(1) The fuel injected by the racks 4—4a and 5—5a is partly broken into spray by the primary air passing through the opening 10, which permits of the supply of a core of flame in the interior of the space formed by the walls 1 and 2;

(2) A supply of primary air is obtained through the upstream opening 10, the section of which is determined with a view to obtaining the optimum mixture;

(3) The initiation and the stabilisation of the flame are ensured by the turbulence created by the inclined walls 1 and 2, the fins 3 and the injection racks 4 and 5.

In addition, the walls 1 and 2 being brought up to a high temperature as a result of the combustion which takes place in the centre of the device, or again, due to the fact that the latter is situated in a flow of hot gases (which is especially the case with a post-combustion chamber), a vaporisation of the fuel is produced which comes into contact with these hot walls and runs down along them.

This device thus enables a good combustion to be effected in a flow at high speed, even under reduced pressure (for example at high altitudes) and using only fuel of low volatility such as lamp-oil or kerosene, which are generally used for turbo-jet units and ram-jet units.

In the form of embodiment of Fig. 3, the body 11 of the device is a body of revolution and the injection rack 12, also circular, is spaced away from the wall to form an annular passage 13 for the inlet of primary air to the interior of the device. The injector 12 comprises a plurality of orifices 14 directed towards the wall 11 so as to form a series of elementary inclined jets 15 which come into contact with the wall and cause the fuel to flow down it.

The operation of the device shown in Fig. 3 is similar to that previously described. However, in this case, the frusto-conical wall 11 is extended at its upstream extremity by an annular edge 16 which projects toward the interior and creates by this means an interior turbulence which is added to that produced by the body of the injector 12.

The form of embodiment of Figs. 4 and 5 differs from that preceding only in the shape of the injection rack. The latter is constituted by a ring 17 having one or a number of rows of orifices 18 forming jets 19 inclined towards the exterior and a few orifices 20 which form jets directed on the contrary towards the interior and intended to supply fuel to the central portions of the burner; finally, a row of orifices 22 enables jets to be produced parallel to the direction of flow F.

Fig. 6 shows a combination intended to ensure effective combustion under particularly difficult conditions.

A separate injection rack 24 introduces fuel on the upstream side of a streamlined body 25, for example having the form of a wing. This body which is hollow, contains a chamber 26 which opens out into the trailing edge through an opening 27 and is supplied with fuel through an injector 28, an intake of combustion-supporting air (not shown) being also provided, together with an ignition device. This arrangement enables a pilot-flame to be obtained, which has the accessory effect of heating the walls of the streamlined body 25, so that the fuel injected on the upstream side, at 24, is subjected to a pre-vaporisation when it comes into contact with the outer hot surface of the streamlined body 25.

On the downstream side of this latter is mounted a device similar to that of Figs. 1 and 2, but in which the injection racks 29 and 30 comprise, in addition to the interior orifices 31 and 32, orifices 33 and 34 which deliver towards the exterior of the walls 1 and 2. The fuel injected by these exterior orifices 33 and 34 is mixed with the fuel injected by the rack 24 and which has been pre-vaporised in contact with the streamlined body 25.

It should be noted that the pilot-flame, extending beyond the opening 27 in the trailing edge, also increases the temperature of the fuel from the racks 29 and 30, thus facilitating its vaporisation and therefore its combustion.

The injector-burner-stabiliser of Fig. 6 is further provided with an auxiliary screen 35 mounted on a plate 36 and intended to stabilise or hold the flame in course of initiation at the interior of the space formed by the walls 1 and 2.

As has already been stated above, the injector-burner-stabiliser of the invention enables an effective combustion to be obtained, even under especially severe conditions of high speed and low temperatures and pressures, conditions which are particularly met with in the post-combustion chambers of reaction propulsion units intended for flight at high speeds and at high altitudes.

As the post-combustion is only put into operation for short periods when it is necessary to produce a momentary increase in thrust, for example during taking-off, it may be an advantage to reduce as far as possible the resistance offered to the flow by this device when it is not in use, that is to say during the normal operation of the propulsion unit. To this end, a retractable device may advantageously be provided, constructed in accordance with any known means.

The form of embodiment shown in Figs. 7 and 8 relates to an injector-burner-stabiliser device of annular form with oppositely-inclined frusto-conical surfaces 50 and 51 enclosing an annular divergent chamber. The injection racks 40 and 41 on the leading edges of the surfaces 50 and 51 are circular and concentric. Like those of the preceding forms of embodiment, they form jets of fuel 42 and 43 directed towards the opposite walls 51 and 50 respectively.

The upstream opening 10 for the intake of primary air is not continuous as in the previous examples: this opening is closed by a circular band 52 pierced with holes 53 for the passage of primary air. The number of orifices 53, their positions and also their size, are determined in such manner as to obtain the most favourable mixture for combustion. They permit, in fact, of an exact dosage of primary air as a function of the rate of flow of fuel.

The two frusto-conical surfaces 50 and 51 are provided with radial slots or notches 54 to facilitate their expansion due to the effect of the temperature, and creating in addition vortices on the downstream side of the latter due to the ingress of secondary air, which gives rise to darts of flame of small extent in a direction substantially parallel to the axis of flow.

In the case of very rich mixtures or with devices intended to increase temporarily the thrust of the reactor, it is possible to combine the burner-injector-stabiliser of the invention with supplementary injectors located in its vicinity.

Fig. 9 shows by way of example one of the various combinations which are possible. In this figure, supplementary injectors 55 supplied from a collector 56 are distributed on each side of the annular device 50—51. The position of the injectors 55 is determined in such manner that the external contour of the jet of fuel comes just level with the castallated trailing edges of the frusto-conical surfaces 50 and 51. The finely-vaporised fuel burns perfectly by virtue of the core of flame which is formed on the downstream side of the surfaces 50 and 51.

The length of the flame produced by the device shown in Fig. 9 may again be reduced by arranging a grid 59 at a certain distance towards the downstream side, determined by the length of the core of flame 58 (see Fig. 10). This grid, placed in the position which corresponds substantially to the downstream extremity of the turbulent core of flame 58, is of course hotter at its central part 59a which passes through this core, but this increase in temperature is compensated by the vaporisation of the fuel on the annular surface 59b surrounding the hot section 59a, and the temperature of this section is reduced by conduction.

On the downstream side of the grid 59 is formed a homogeneous flame facilitated by the increase in the temperature of the mixture.

The form of embodiment shown in Fig. 11 comprises a succession of burner-stabiliser-ejector device arranged in tiers of increasing diameter in the direction of the flow.

In this form of embodiment, the outer surface 50 is extended by a frusto-conical surface 60 which forms a protecting screen for the wall 62 of the combustion chamber 61.

This arrangement has a further appreciable advantage in connection with thermal machines of the continuous-flow internal combustion type in general, and ram-jet units in particular. In such machines, it may be necessary to reduce to the maximum extent the surface of the outer wall of the chamber which works at a high temperature. This can be obtained by using a number of burner-injector-stabiliser rings lightly charged with fuel per unit of length, arranged as before.

Finally, the form of embodiment shown in Fig. 12 is applicable in cases of operation at low temperatures and pressures and at high speeds, for which the stabiliser ring alone may not be able to maintain the flame.

In this form of embodiment, a pre-combustion chamber 63 is shaped in such manner as to slow down the air which passes in the direction of the arrow F to a very low value of speed, for which combustion is still possible. The flame is established slightly on the downstream side of a plane 64 which further is provided with solid screens and, if necessary, the gases thus generated are cooled by the secondary air passing through the conduits 65 at the periphery of the chamber 63 and delivering beyond the plane 64. The hot gases are then led through conduits 66 into an annular collector 67 in which they are mixed with the air coming from the conduits 65 and then pass into the burner-injector-stabiliser device 50—51 through the upstream orifices 53 and the downstream slots 54.

The temperature of the combustion-supporting gas which supplied the core of flame produced by the device 50—51 increases and the combustion then becomes possible at the speed of the main flow of the thermal machine.

It will of course be understood that modifications may be made to the forms of embodiment which have just been described, in particular by the substitution of equivalent technical means, without thereby departing from the spirit or from the scope of the present invention.

What is claimed is:

1. In a combustion chamber designed to operate with a high-velocity air stream, a combined burner and flameholder device comprising a generally V-shaped section body having a relatively narrow upstream end and diverging walls bounding a diffuser-like inner space within said combustion chamber, passage means at said end for the admission of a fraction of said stream in said space, an obstacle projecting from said walls into said space in the vicinity of said end whereby a turbulent zone is formed along said walls downstream of said obstacle, and liquid fuel injecting means positioned in the vicinity of said end and pointing in a direction which is substantially inclined with respect to the main flow direction of air through said space and which intersects said walls downstream of said obstacle, whereby liquid fuel jets issuing from said fuel injecting means impinge on said walls in said turbulent zone so that the fuel jets wet said walls downstream of said obstacle.

2. Device as claimed in claim 1, comprising a plurality of bodies of annular shape extending in cascade formation around the axis of the combustion chamber, each body comprising two opposite walls of unequal lengths measured parallel to said axis.

3. Device as claimed in claim 2, wherein the walls of the bodies extend farther downstream, the more remote they are from the axis of the combustion chamber.

4. Device as claimed in claim 1, comprising further turbulence generating fins projecting outwardly from the walls of the body substantially along the entire length of said walls.

5. Device as claimed in claim 1, comprising further an enclosure in which the body is housed, an auxiliary pre-combustion chamber shaped so as to slow down said high-velocity airstream and adapted to generate hot gases, piping means between said pre-combustion chamber and said enclosure to supply the latter with said hot gases and means for supplying air to said enclosure, said air being mixed with said hot gases upstream of said body.

6. Device as claimed in claim 1, comprising further a grid extending transversely of the combustion chamber at a distance downstream of the body substantially at the downstream extremity of the turbulent cone of flame.

7. Device as claimed in claim 1, comprising additional fuel injectors external to the body and positioned and directed so that the fuel jets issuing therefrom wet the downstream end of the walls of said body.

8. In a combustion chamber designed to operate with a high-velocity airstream, a combined burner and flameholder device comprising a generally V-shaped section body having a relatively narrow upstream end and diverging walls bounding a diffuser like inner space within said combustion chamber, passage means at said end for the admission of a fraction of said stream in said space, an obstacle projecting from said walls into said space whereby a turbulent zone is formed along said walls downstream of said obstacle, and liquid fuel injecting means positioned in the vicinity of said passage means and pointing in a direction which is substantially inclined with respect to the mean flow direction of air through said space and which intersects said walls downstream of said obstacle, whereby fuel jets issuing from said fuel injecting means impinge on said walls in said turbulent zone, the said obstacle constituting a fuel supply manifold for the fuel injecting means.

9. In a combustion chamber designed to operate with a high-velocity air stream, a combined burner and flameholder device comprising a generally V-shaped section body having a relatively narrow upstream end and diverging walls bounding a diffuser-like inner space within said combustion chamber, passage means at said end for the admission of a fraction of said stream in said space, an obstacle projecting from said walls into said space whereby a turbulent zone is formed along said walls downstream of said obstacle, and liquid fuel injecting means positioned in the vicinity of said passage means and pointing in a direction which is substantially inclined with respect to the mean flow direction of air through said space and which intersects said walls downstream of said obstacle, whereby fuel jets issuing from said fuel injecting means impinge on said walls in said turbulent zone, the said obstacle being an upstream extension of the walls, which is curved back downstream and which forms an outer periphery of the passage means, and the fuel injecting means comprising a support opposite said extension and forming an inner periphery of said passage means.

References Cited in the file of this patent

UNITED STATES PATENTS

| 2,554,401 | Christensen et al. | May 22, 1951 |
| 2,625,788 | Neikirk et al. | Jan. 20, 1953 |
| 2,679,137 | Probert | May 25, 1954 |
| 2,685,168 | Malick | Aug. 3, 1954 |
| 2,690,809 | Kerry | Oct. 5, 1954 |
| 2,704,435 | Allen | Mar. 22, 1955 |
| 2,704,440 | Nicholson | Mar. 22, 1955 |
| 2,707,372 | Cleveland | May 3, 1955 |
| 2,872,785 | Barrett et al. | Feb. 10, 1959 |
| 2,931,174 | Allen | Apr. 5, 1960 |

FOREIGN PATENTS

| 201,618 | Australia | Apr. 20, 1956 |
| 723,830 | Great Britain | Feb. 9, 1955 |
| 1,109,634 | France | Sept. 28, 1955 |